United States Patent
Tsai (10) Patent No.: US 10,346,547 B2
(45) Date of Patent: Jul. 9, 2019

(54) DEVICE FOR AUTOMATIC COMPUTER TRANSLATION OF PATENT CLAIMS

(71) Applicant: INTEGRAL SEARCH INTERNATIONAL LIMITED, Taipei (TW)

(72) Inventor: Hong-Shin Tsai, Taipei (TW)

(73) Assignee: INTEGRAL SEARCH INTERNATIONAL LIMITED, Taipei (TW)

( * ) Notice: Subject to any disclaimer, the term of this patent is extended or adjusted under 35 U.S.C. 154(b) by 0 days.

(21) Appl. No.: 15/695,537

(22) Filed: Sep. 5, 2017

(65) Prior Publication Data

US 2018/0157650 A1 Jun. 7, 2018

(30) Foreign Application Priority Data

Dec. 5, 2016 (TW) .............................. 105140048 A
Jul. 3, 2017 (TW) .............................. 106122185 A (51) Int. Cl.
*G06F 17/28* (2006.01)
*G06F 17/27* (2006.01)
*G06Q 50/18* (2012.01)

(52) U.S. Cl.
CPC ........ *G06F 17/2881* (2013.01); *G06F 17/277* (2013.01); *G06F 17/2785* (2013.01); *G06F 17/2872* (2013.01); *G06Q 50/184* (2013.01)

(58) Field of Classification Search
None
See application file for complete search history.

(56) References Cited

U.S. PATENT DOCUMENTS

| | | | | |
|---|---|---|---|---|
| 5,111,398 A | * | 5/1992 | Nunberg | G06F 17/274 704/6 |
| 5,136,503 A | * | 8/1992 | Takagi | G06F 17/271 704/2 |
| 5,490,061 A | * | 2/1996 | Tolin | G06F 17/2755 704/2 |

(Continued)

*Primary Examiner* — Fariba Sirjani
(74) *Attorney, Agent, or Firm* — Maschoff Brennan (57) ABSTRACT

A device for automatic translation of patent claims automatically translates a first language claim into a second language claim. The device includes an element noun retrieving module, a complement determining module, an organizing module. and an automatic computer translating module. The element noun retrieving module retrieves an element noun from the first language claim. The complement determining module determines a complement definition from the first language claim, as a combination of an interrelationship definition and object element. The organizing module forms an organized structure by organizing the element noun, interrelationship definition, object element and an organization identifying word. The automatic computer translating module determines a translation sequence of complement definitions in the organized structure according to a defining sequence of all complement definitions in the organized structure or according to an interrelationship definition belonging attribute of each interrelationship definition in the organized structure to obtain a second language claim translation.

15 Claims, 6 Drawing Sheets

(56) References Cited

U.S. PATENT DOCUMENTS

| | | | |
|---|---|---|---|
| 6,233,546 B1* | 5/2001 | Datig | G06F 17/271 |
| | | | 704/7 |
| 2005/0027512 A1* | 2/2005 | Waise | G06F 17/271 |
| | | | 704/9 |
| 2005/0060160 A1* | 3/2005 | Roh | G06F 17/2872 |
| | | | 704/277 |
| 2007/0150260 A1* | 6/2007 | Lee | G06F 17/2818 |
| | | | 704/2 |
| 2008/0319736 A1* | 12/2008 | Toutanova | G06F 17/2818 |
| | | | 704/9 |
| 2013/0226556 A1* | 8/2013 | Hwang | G06F 17/2818 |
| | | | 704/2 |
| 2017/0075877 A1* | 3/2017 | Lepeltier | G06F 17/2705 |

* cited by examiner

| A | Interrelationship definition belonging attribute | |
|---|---|---|
| 1 | Direction-positioning attribute | on the (adjusting gear) |
| 2 | Pesent-participle-with-preposition-following attribute | connecting to (the adjusting gear) |
| 3 | Pesent-participle-without-preposition-following attribute | connecting (the adjusting gear) |
| 4 | Past participle attribute | connected to (the adjusting gear) |
| 5 | Action attribute | to connect (the adjusting gear) |
| 6 | Subordination attribute | comprising (an adjusting gear) |
| 7 | Means attribute | by (the adjusting gear) |

FIG.3

A connector, comprising : 41
 an antenna
   having   an elongated pad and
   42    a upward extending receiver
                      41

A connector, comprising :
 an antenna
   on a surface of a housing
     connecting to a pad
       disposed on a hole
         to receiver a signal
           by a front end of the antenna .

FIG.5

A connector, comprising :
    an antenna                         1211
        connected to a pad            /
            by a front end of the antenna ;

FIG.6

A connector, comprising :
    an antenna                         1211
        connected to a pad            /
            along a horizontal direction
            by a front end of the antenna ;

FIG.7

A connector, comprising :
  an antenna
     being extended a wing portion
       connected to a pad
        along a horizontal direction
         by a front end of the antenna ;

FIG.8A

A connector, comprising :
  an antenna
     being extended a wing portion connected to a pad
     along a horizontal direction
       by a front end of the antenna ;

FIG.8B

A connector, comprising :
　an antenna
　　　connecting a pad
　　　　　to transmit a signal ;

FIG.9A

A connector, comprising :
　an antenna
　　　connecting a pad to transmit a signal ;

FIG.9B

DEVICE FOR AUTOMATIC COMPUTER TRANSLATION OF PATENT CLAIMS

FIELD OF THE INVENTION

The present invention relates to an automatic computer translating device, and more particularly relates to a computer automatically claim-translating device.

BACKGROUND OF THE INVENTION

Patent claims are always considered difficult to understand for general public, and even for the professionals in the field of patent too. When it comes to the claims written in a foreign language, a more difficult challenge that can be very annoying for general public to induce the need for translation, and thus in this situation automatic computer translating offers a convenient option. However, automatic computer translating is progressing by time with more and more improved function, but it is generally recognized that using automatic computer translating, for example, google translation and Dr. eye, to translate the claims is impractical. The reason is that the claims themselves are with complicated written structure that the complicated relationships among subject, verb, present participle, past participle and object cause the automatic computer translating producing various error conditions, such as subject being positioned in error that it does not appear at the beginning of the sentence, omission or incorrect combination because of a too long text, and structural confusion because of participles too complicated as well due to the complicated grammatical structure among subject, verb, present participle, past participle object of patent claims. It thus leads to a dissatisfactory result. Besides, the translation result produced by automatic computer translating without showing the structured translation content brings less benefit for a reader to quickly understand its substantial content, and thus a further error-checking becomes difficult.

For these problems, the inventor of the present invention has discovered that a particular written structure of the claims themselves and the particular grammatical structure under the particular written structure can just be served to solve the problems mentioned above. In other words, by means of hierarchically establishing structural sequential relationships of the subject and complement formed by an interrelationship definition and an object in combination with a rule that is with or without modifying translation sequence of all complement according to its interrelationship definition belonging attribute defined in the complements corresponding to a subject or a section, we can obtain that the error conditions, such as omissions, incorrect combinations, and structure confusions, be avoided, resulting in a translation content with extremely high accuracy and easiness for reading.

SUMMARY OF THE INVENTION

Therefore, an objective of the present invention is to provide a computer automatically claim-translating device to avoid the conditions of error, such as omissions, incorrect combinations, and structure confusions, thereby leading to a translation content with extremely high accuracy and easiness for reading.

In order to achieve the above, the present invention provides a computer automatically claim-translating device that, automatically translates a first language claim into a second language claim, the computer automatically claim-translating device comprising: an element noun retrieving module which retrieves an element noun from the first language claim according to a rule of part of speech of the first language claim; a complement determining module which determines a complement definition from the first language claim, the complement definition being a combination of an interrelationship definition and an object element, the object element being the element noun neighboring after the interrelationship definition, the complement determining module also determining an interrelationship definition belonging attribute belonging to the interrelationship definition of the complement definition; an organizing module which performs a structure organization to form an organized structure by organizing the element noun, the interrelationship definition, the object element and an organization identifying word according to an organizing rule, the organization identifying word including words of "and" and ",", and the organizing rule being formed by sequential relationship among the element noun, the interrelationship definition, the object element and the organization identifying word; and an automatic computer translating module which determines a translation sequence of all complement definitions in the organized structure according to a defining sequence of all complement definitions in the organized structure or according to an interrelationship definition belonging attribute, determined by the complement determining module, belonging to each interrelationship definition in the organized structure so as to obtain a second language claim translation result.

In one embodiment of the present invention, a computer automatically claim-translating device is provided that the interrelationship definition belonging attribute is one selected from a group comprising a direction-positioning attribute, a present-participle-with-preposition-following attribute, a present-participle-without-preposition-following attribute, a past participle attribute, an action attribute, a subordination attribute and a means attribute.

In one embodiment of the present invention, a computer automatically claim-translating device is provided that the automatic computer translating module combines a subordinating element noun with the interrelationship definition having the subordination attribute to perform translation, and the subordinating element noun is corresponding to the interrelationship definition having the subordination attribute.

In one embodiment of the present invention, a computer automatically claim-translating device is provided that the automatic computer translating module rearranges the translation sequence of the complement definitions for performing translation.

In one embodiment of the present invention, a computer automatically claim-translating device is provided that interrelationship definition having the past participle attribute is translated in combination of the front neighbor interrelationship definition.

In one embodiment of the present invention, a computer automatically claim-translating device is provided that the interrelationship definition having the subordination attribute is configured with the highest translation priority in the translation sequence as compared to the other interrelationship definitions.

In one embodiment of the present invention, a computer automatically claim-translating device is provided that the interrelationship definition having the means attribute is configured with the highest translation priority in the translation sequence as compared to the other interrelationship definitions or is configured with a translation priority higher to any other interrelationship definitions but only lower than the subordination attribute interrelationship definition in the translation sequence.

In one embodiment of the present invention, a computer automatically claim-translating device is provided that the interrelationship definition having the direction-positioning attribute is reorganized to raise in a translation sequence comparing to the interrelationship definition with other interrelationship definition belonging attributes, or is organized to be next only to the interrelationship definition having the subordination attribute and the means attribute in a translation sequence.

In one embodiment of the present invention, a computer automatically claim-translating device is provided that the automatic computer translating module performs the translation by combining the interrelationship definition having the action attribute with the front neighbor interrelationship definition and/or front located interrelationship definition having the present-participle-without-preposition-following attribute.

In one embodiment of the present invention, a computer automatically claim-translating device is provided that the interrelationship definitions having different interrelationship definition belonging attributes are translated with different translation sequences.

In one embodiment of the present invention, a computer automatically claim-translating device is provided that the translation result is obtained by displaying by a organized structure formed by the element nouns, the interrelationship definitions and the objective elements.

The computer automatically claim-translating device of the present invention possesses the technical effects mentioned below. The inventor of the present invention has discovered that a particular written structure of the claims themselves and the particular sentence structure under the particular written structure can just be served to improve the problems mentioned above. In other words, by means of hierarchically establishing structural sequential relationships of the subject and complement formed by an interrelationship definition and an object in combination with a rule that is with or without modifying translation sequence of all complements according to its interrelationship definition belonging attribute defined in the complements corresponding to a subject or a section, we found that the error conditions, such as omissions, incorrect combinations, and structure confusions, be avoided, resulting in a translation content with extremely high accuracy and easiness for reading.

DETAILED DESCRIPTION OF THE PREFERRED EMBODIMENTS

With reference to FIGS. 1 to 9B, the embodiments of the present invention are described. The description does not limit the scope of the embodiments but is one of the embodiments of the present invention.

Figure 2:
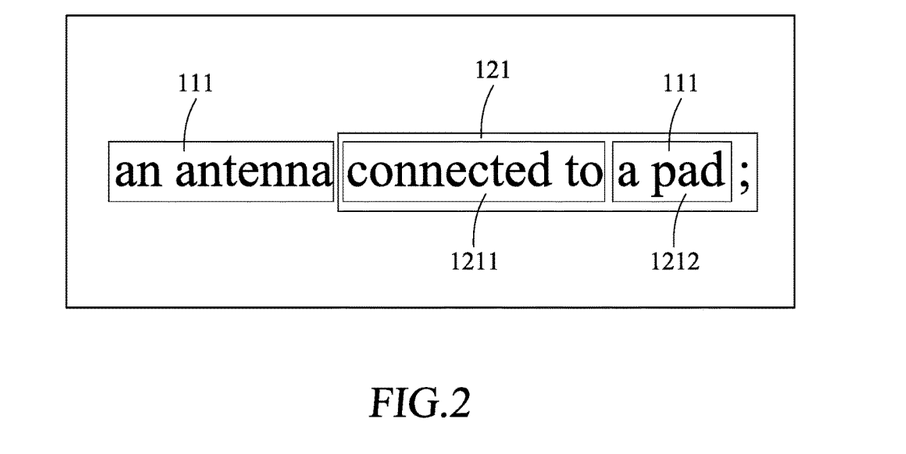
FIG. 2 is a structure schematic diagram showing mantled elements of the computer automatically claim-translating device according to one embodiment of the present invention.

In FIG. 2, "an antenna" and "a pad" are element nouns 111 retrieved by utilizing a rule of part of speech R. A portion, i.e., "connected to", other than the element noun 111 is an interrelationship definition 1211. An element noun, i.e., "a pad", following behind the interrelationship definition 1211 is defined as an object element 1212. A complement 121, i.e., "connected to a pad", is obtained by combining the interrelationship definition 1211 and the object element 1212. The detailed embodiment thereof can be found in Taiwan Invention Patent number I550422 in which how element nouns 111 are retrieved according to a rule of part of speech R can be found.

Figure 3:
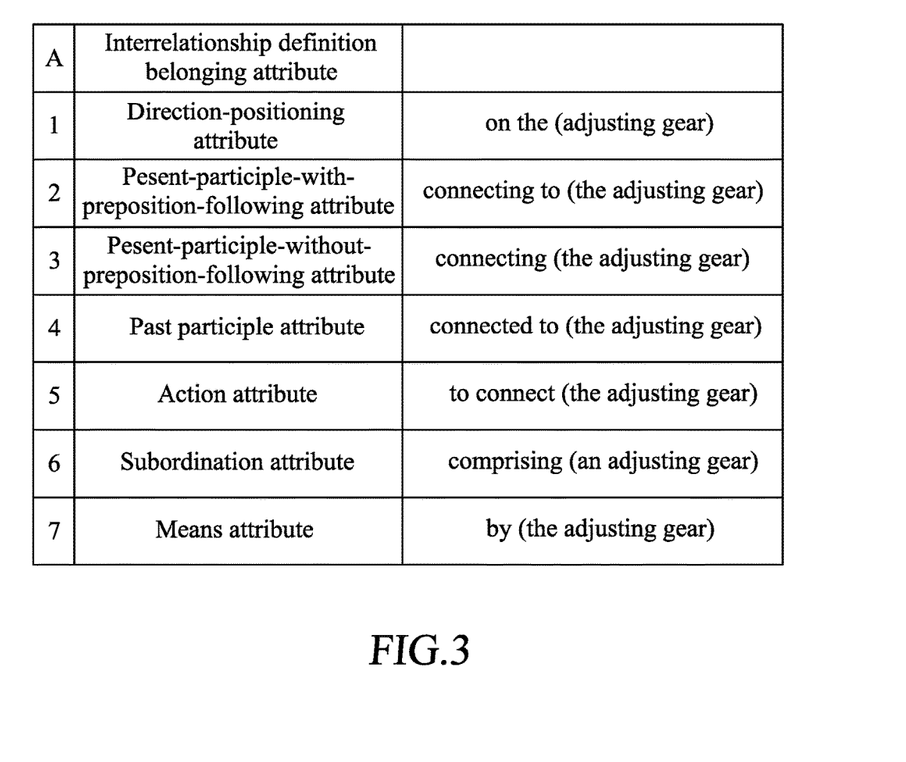
FIG. 3 is a schematic table showing interrelationship definition belonging attributes belonging to the interrelationship definition of the computer automatically claim-translating device according to one embodiment of the present invention.

In FIG. 3, one interrelationship definition has its own interrelationship definition belonging attribute. The interrelationship definition belonging attribute can be one selected from a group comprising a direction-positioning attribute, a present-participle-with-preposition-following attribute, a present-participle-without-preposition-following attribute, a past participle attribute, an action attribute, a subordination attribute and a means attribute. The direction-positioning attribute is an interrelationship definition belonging attribute belonging to an interrelationship definition possessing an adverb relating to direction or position in the beginning of interrelationship definition, such as "in", "on", "along", "toward" or "at", whose examples can be found as "on (the adjusting gear)", "on (the housing)", "along (a parallel direction)", and "toward (an operating side of the gear)". The present-participle-with-preposition-following attribute is an interrelationship definition belonging attribute belonging to an interrelationship definition possessing a present participle, V-ing, followed by a preposition, whose example can be found as "connecting to (the adjusting gear)". The present-participle-without-preposition-following attribute is an interrelationship definition belonging attribute belonging to an interrelationship definition possessing a Ving directly followed by an object and not directly followed by a preposition, whose example can be found as "connecting (the adjusting gear)". The past participle attribute is an interrelationship definition belonging attribute belonging to an interrelationship definition possessing a pass participle, V-ed, whose example can be found as "connected to (the adjusting gear)". The action attribute is an interrelationship definition belonging attribute belonging to an interrelationship definition possessing "to" followed by a verb, whose example can be found as "to connect (the adjusting gear)". The subordination attribute is an interrelationship definition belonging attribute belonging to an interrelationship definition possessing a subordinate verb, such as, "comprising", "including", "having" and "with", whose example can be found as "comprising (an adjusting gear)". The means attribute is an interrelationship definition belonging attribute belonging to an interrelationship definition possessing a means attribute word, such as "by", and "via", whose example can be found as "by (the adjusting gear)".

Figure 1:
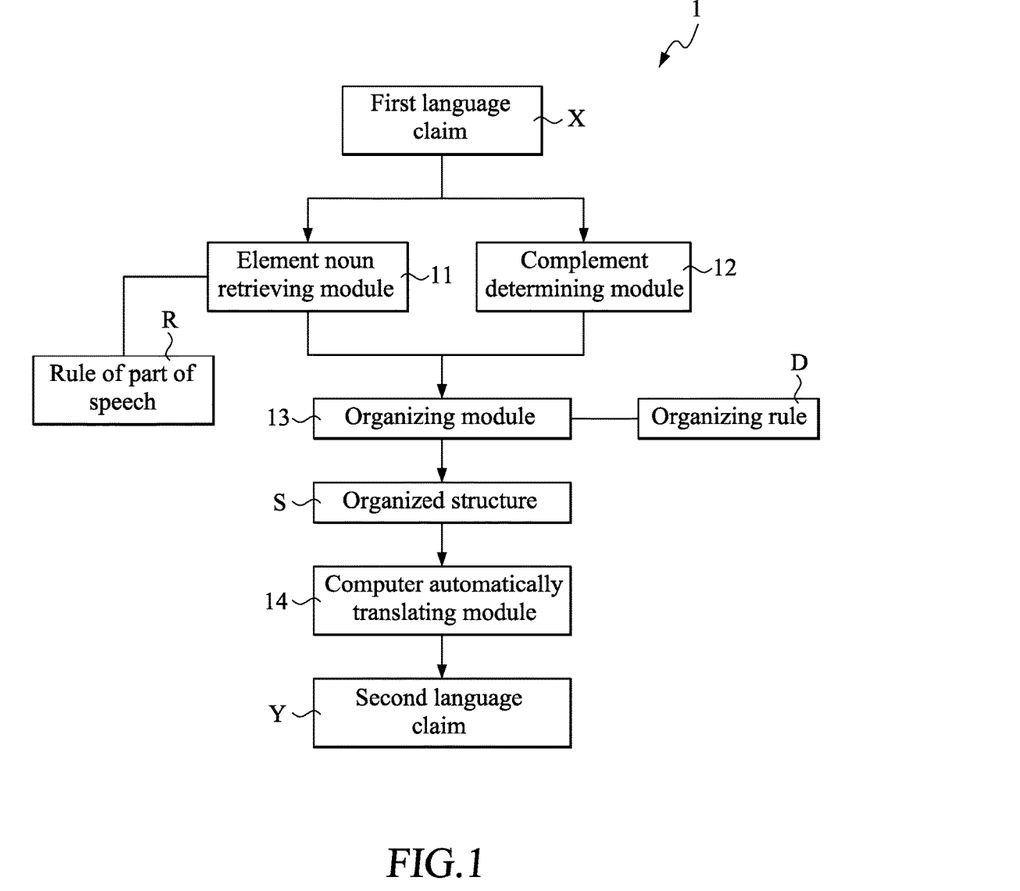
FIG. 1 is a block diagram showing a computer automatically claim-translating device according to one embodiment of the present invention.

As shown in FIG. 1, a computer automatically claim-translating device 1 according to one embodiment of the present invention automatically translates a first language claim X into a second language claim Y, the computer automatically claim-translating device 1 comprising: an element noun retrieving module 11 which retrieves an element noun 111 from the first language claim X according to a rule of part of speech R of the first language claim X; a complement determining module 12 which determines a complement definition 121 from the first language claim X, the complement definition 121 being a combination of an interrelationship definition 1211 and an object element 1212, the object element 1212 being the element noun 111 neighboring after the interrelationship definition 1211, the complement determining module 12 also determining an interrelationship definition belonging attribute A belonging to the interrelationship definition 1211 of the complement definition 121; an organizing module 13 which performs a structure organization to form an organized structure S by organizing the element noun 111, the interrelationship definition 1211, the object element 1212 and an organization identifying word W according to an organizing rule D, the organization identifying word W including words of "and" and ",", and the organizing rule D being formed by sequential relationship among the element noun 111, the interrelationship definition 1211, the object element 1212 and the organization identifying word W; and an automatic computer translating module 14 which determines a translation sequence of all complement definitions in the organized structure S according to a defining sequence of all complement definitions in the organized structure S or according to an interrelationship definition belonging attribute A, determined by the complement determining module, belonging to each interrelationship definition 1211 in the organized structure S so as to obtain a second language claim Y translation result.

As mentioned above, in FIG. 3, in a computer automatically claim-translating device 1 according to one embodiment of the present invention, the interrelationship definition belonging attribute A is one selected from a group comprising a direction-positioning attribute, such as "on (the adjusting gear)", a present-participle-with-preposition-following attribute, such as "connecting to (the adjusting gear)", a present-participle-without-preposition-following attribute, such as "connecting (the adjusting gear)", a past participle attribute, such as "connected (to the adjusting gear)", an action attribute, such as "to connect (the adjusting gear)", a subordination attribute, such as "comprising (an adjusting gear)" and a means attribute, such as "by (the adjusting gear)".

Figure 4:
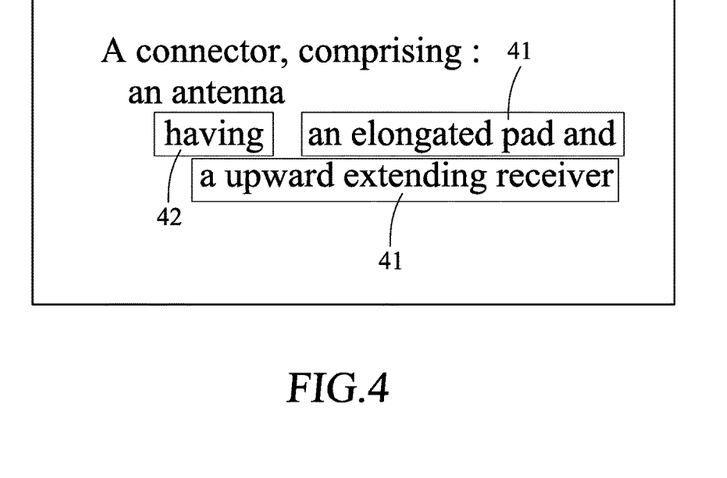
FIG. 4 illustrates an example for explaining a data structure utilized to achieve the computer automatically claim-translating device according to one embodiment of the present invention.

As shown in FIG. 4, in a computer automatically claim-translating device 1 according to one embodiment of the present invention, the automatic computer translating module 14 combines a subordinating element noun 41, such as "an elongated pad" and "an upward extending receiver", with an interrelationship definition 42 having the subordination attribute, such as "having", to perform translation, and the subordinating element noun, such as "an elongated pad" and "an upward extending receiver", is corresponding to the interrelationship definition having the subordination attribute. In other words, the subordinating element noun, such as "an elongated pad" and "an upward extending receiver", is translated in a way by being combined with and behind the interrelationship definition 42 having the subordination attribute A, such as "having", to perform translation.

In a computer automatically claim-translating device 1 according to one embodiment of the present invention, the automatic computer translating module 14, when performing translation, follows a principle of translation that the subject is always translated firstly, and rearranges the translation sequence of all complement definitions 121 according to the interrelationship definition belonging attribute A belonging to the interrelationship definition 1211 of all complement definitions 121. In addition, the translation result is displayed with a form the same as the organized structure S. The computer automatically claim-translating device 1 of the present invention not only can rearrange the translation sequence of all complement definitions in the organized structure as above, the computer automatically claim-translating device 1 of the present invention but also can be performed with the same translation sequence as the organized structure S of all complement definitions.

Figure 5:
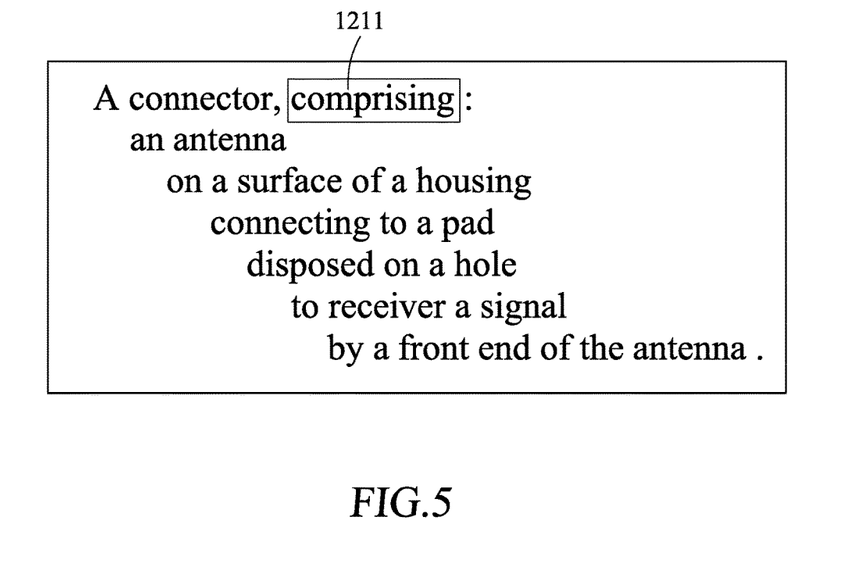
FIG. 5 illustrates another example for explaining a data structure utilized to achieve the computer automatically claim-translating device according one embodiment of the present invention.

Mentioned below is one embodiment of the present invention explaining the details regarding how to "rearrange the translation sequence of all complement definitions 121 according to the interrelationship definition belonging attribute A belonging to the interrelationship definition 1211 of all complement definitions 121". As shown in FIG. 5, in a computer automatically claim-translating device 1 according to one embodiment of the present invention, after the subject such as a connector is translated, the interrelationship definition 1211 having the subordination attribute, such as "comprising", is configured with the highest translation priority as compared to the interrelationship definitions 1211 of the other interrelationship definition belonging attributes in the translation sequence. In other words, the interrelationship definition 1211 having the subordination attribute, such as "comprising", "including" and "having", is configured with the highest translation priority in the translation sequence as compared to the direction-positioning attribute, such as "on" (the adjusting gear), "on" (the housing), "along" (a parallel direction) and "toward" (an operating side of the gear), the present-participle-with-preposition-following attribute, such as "connecting to" (the adjusting gear), the present-participle-without-preposition-following attribute, such as "connecting" (the adjusting gear), the past participle attribute, such as "connected to" (the adjusting gear), the action attribute, such as "to connect" (the adjusting gear), or the means attribute, such as "by" (the adjusting gear). Therefore, an original content to be translated is translated to be:

"一連接器 (A connector), 包含 (comprising):

. . .".

Figure 6:
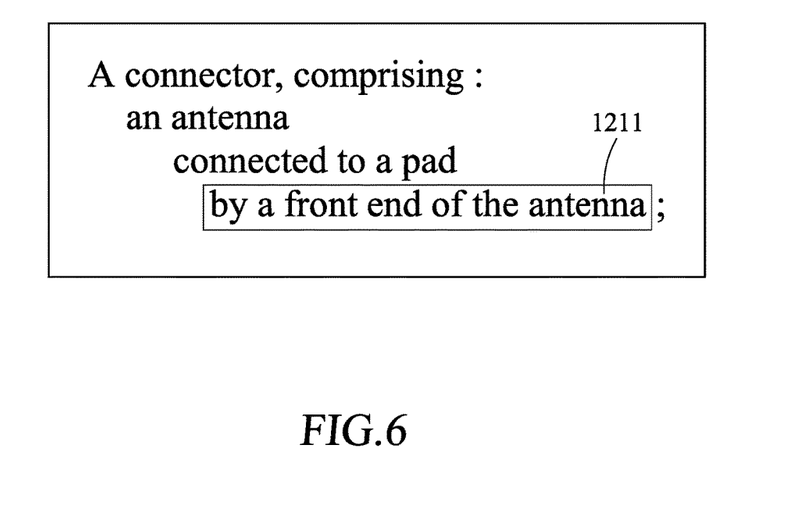
FIG. 6 illustrates an example for explaining a translation sequence of the computer automatically claim-translating device according one embodiment of the present invention.

As shown in FIG. 6, in a computer automatically claim-translating device 1 according to one embodiment of the present invention, the interrelationship definition 1211 having the means attribute, such as "by" (a front end of the antenna), is configured with the highest translation priority in the translation sequence as compared to the other interrelationship definitions, such as "connected to (a pad)", or is configured with a translation priority higher than any other interrelationship definitions but only lower than the subordination attribute interrelationship definition in the translation sequence. Therefore, an original content to be translated is translated to be:

"一連接器 (A connector), 包含 (comprising):
　一天線 (an antenna)'
　　藉由該天線的一前端 (by a front end of the antenna)
　　而連接至一墊片 (connects to a pad);"

In other words, "by a front end of the antenna" is translated before "connected to a pad". This rearrangement of translating sequence improves the translating fluency for many languages other than English.

Figure 7:
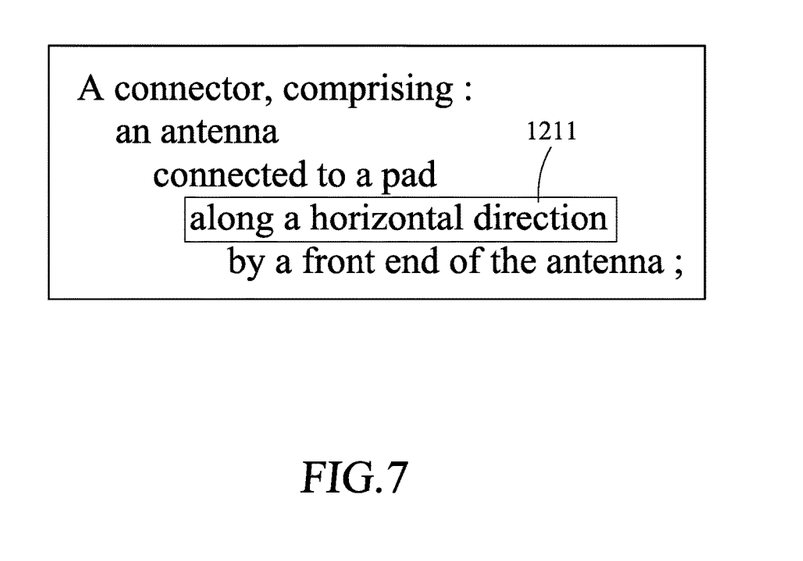
FIG. 7 illustrates an example for explaining a translation sequence of the computer automatically claim-translating device according one embodiment of the present invention.

As shown in FIG. 7, in a computer automatically claim-translating device 1 according to one embodiment of the present invention, the interrelationship definition 1211 having the direction-positioning attribute, such as "along a horizontal direction", is configured with the highest translation priority in the translation sequence as compared to the other interrelationship definitions, or is configured with a translation priority higher than any other interrelationship definitions but only lower than the subordination attribute and the means attribute interrelationship definition in the translation sequence. Therefore, an original content to be translated is translated to be such as:

"一連接器 (A connector), 包含 (comprising):
　一天線 (an antenna),
　　藉由該天線的一前端 (by a front end of the antenna)
　　而沿著一水平方向 (along a horizontal direction)
　　而連接至一墊片 (connected to a pad);"

In other words, "along a horizontal direction" is translated before "connected to a pad", and is translated after "comprising" and "by a front end of the antenna". This rearrangement improves the translating fluency for many languages other than English.

Figure 8A:
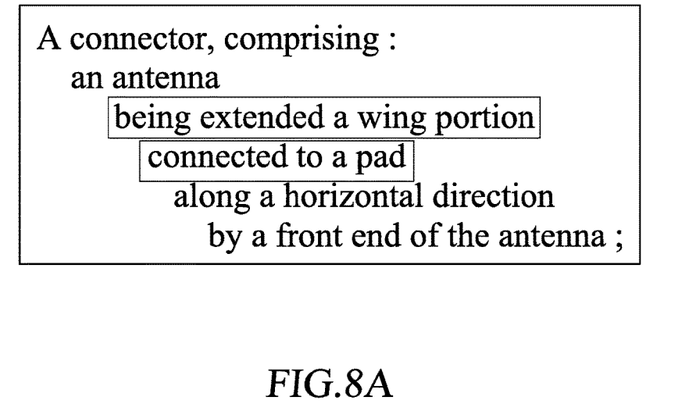
FIG. 8A and FIG. 8B illustrate an example for explaining a combination of complements to achieve a computer automatic translation of the computer automatically claim-translating device according one embodiment of the present invention.
Figure 8B:
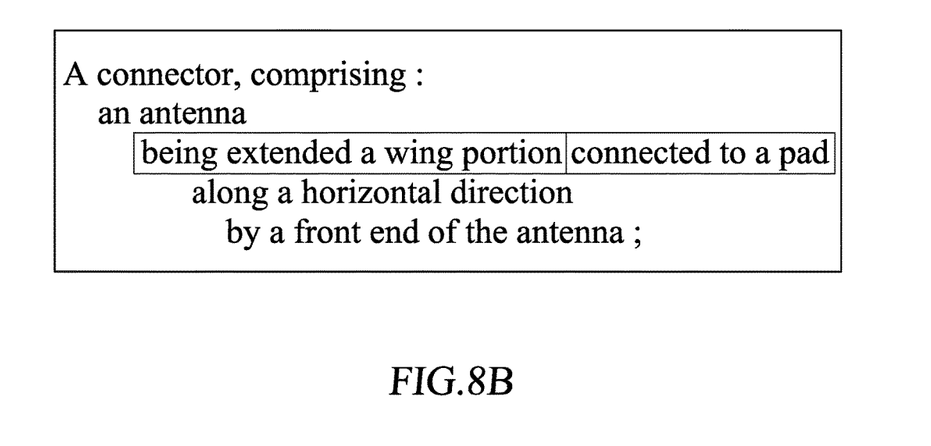

As shown in FIG. 8A, in a computer automatically claim-translating device 1 according to one embodiment of the present invention, the interrelationship definition 1211, such as "connected to a pad", having the past participle attribute is translated in combination of the front neighbor interrelationship definition 1211, such as "being extended a wing portion". In other words, "being extended a wing portion" and "connected to a pad" are combined into "being extended a wing portion connected to a pad", and then the translation is performed according to the form of FIG. 8B. Therefore, an original content to be translated is translated to be such as:

"一連接器 (A connector), 包含 (comprising):
　一天線 (an antenna),
　　藉由該天線的一前端 (by a front end of the antenna)
　　而沿著一水平方向 (along a horizontal direction)
　　而延伸出一連接於一墊片的翼部 (being extended a wing portion connected to a pad);"

Figure 9A:
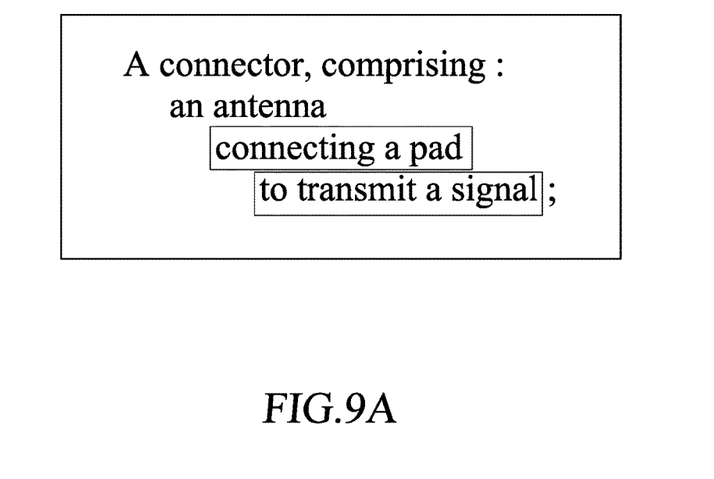
FIG. 9A and FIG. 9B illustrate an example for explaining a combination of complements to achieve a computer automatic translation of the computer automatically claim-translating device according one embodiment of the present invention.
Figure 9B:
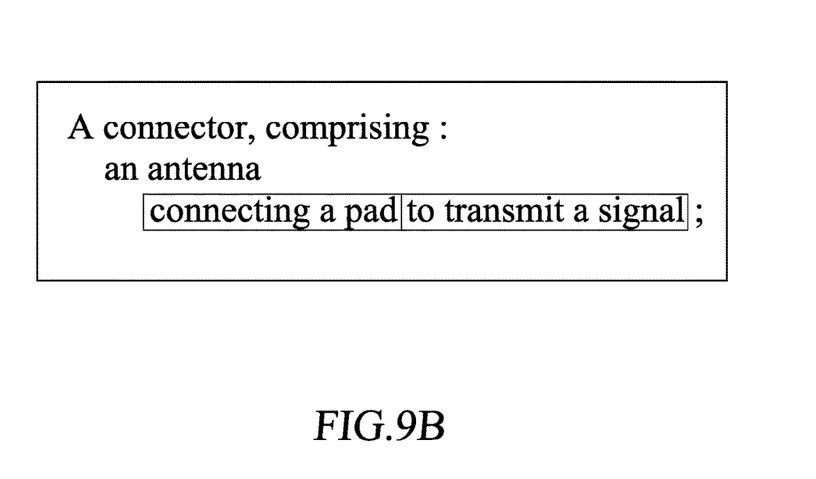

As shown in FIG. 9A, in a computer automatically claim-translating device 1 according to one embodiment of the present invention, the automatic computer translating module 14 performs the translation by combining the interrelationship definition 1211 having the action attribute, such as "to transmit a signal", with the front neighbor interrelationship definition and/or front located interrelationship definition, such as "connecting a pad", having the present-participle-without-preposition-following attribute. In other words, "connecting a pad" and "to transmit a signal" are combined into "connecting to a pad to transmit a signal", and then the translation is performed following the form of FIG. 9B. Therefore, an original content to be translated is translated to be such as:

"一連接器 (A connector), 包含 (comprising):
　一天線 (an antenna),
　　連接一墊片以傳送一訊號 (connecting to a pad to transmit a signal);"

If it exists the direction-positioning attribute or the means attribute between "connecting a pad" and "to transmit a signal", the direction-positioning attribute and the means attribute can be combined together with "connecting a pad" and "to transmit a signal" as their original sequence. But if the interrelationship definition between "connecting a pad" and "to transmit a signal" is not the direction-positioning attribute or the means attribute, the direction-positioning attribute and the means attribute will not be combined together with "connecting a pad" and "to transmit a signal".

As mentioned above, in a computer automatically claim-translating device 1 according to one embodiment of the present invention, the interrelationship definitions 1211 having different interrelationship definition belonging attributes are performed with different translating sequences.

The computer automatically claim-translating device 1 of the present invention can be achieved by rearranging the translation sequence of all complement definitions in the organized structure according to an interrelationship definition belonging attribute thereof as above. Alternatively, the computer automatically claim-translating device 1 of the present invention can be achieved with a translation sequence the same as the organized structure S of all complement definitions. The example thereof can be found by referring to the content shown in FIG. 5, in which after the subject and the interrelationship definition 1211 having the subordination attribute are translated, the computer automatically claim-translating device 1 will perform the translation according to the same organized structure S of all complement definitions. Therefore, an original content to be translated is translated to be such as:

"一連接器 (A connector), 包含 (comprising)
　一天線 (an antenna),
　　位於一殼體的表面 (located on the surface of a case)
　　而連接至一墊片 (connecting to a pad)
　　設置於一孔內 (arranged in a hole)
　. . ."

As the translation result shown above, in a computer automatically claim-translating device 1 according to one embodiment of the present invention, the translation result displays an organized structure organizing the element noun, the interrelationship definition and the object element.

The above description is only an explanation of the preferred embodiments of the present invention. One having ordinary skill in the art can make various modifications according to the above description and the claims defined below. However, those modifications shall still fall within the scope of the present invention.

What is claimed is:

1. A device for automatic computer translation of claims, which automatically translates a first language claim into a second language claim, the device comprising:
   an element noun retrieving module which retrieves an element noun from the first language claim according to a rule of part of speech of the first language claim;
   a complement determining module which is connected to the element noun retrieving module so as to obtain the element noun, the complement determining module being configured to determine a complement definition from the first language claim, the complement definition being a combination of an interrelationship definition and an object element, the object element being the element noun neighboring after the interrelationship definition;

an organizing module which is connected to the element noun retrieving module and the complement determining module so as to obtain the element noun and the complement definition, the organizing module being configured to perform a structure organization to form an organized structure by organizing the element noun, the interrelationship definition, the object element and an organization identifying word according to an organizing rule, the organization identifying word including words of "and" and ",", and the organizing rule being formed by sequential relationship among the element noun, the interrelationship definition, the object element and the organization identifying word; and an automatic computer translating module which is connected to the organizing module so as to obtain the organized structure, the automatic computer translating module being configured to determine a translation sequence of all complement definitions in the organized structure according to a defining sequence of all complement definitions in the organized structure or according to an interrelationship definition belonging attribute, determined by the complement determining module, of each interrelationship definition in the organized structure so as to obtain a second language claim translation result, wherein the automatic computer translating module rearranges the translation sequence of the complement definitions for performing translation, the interrelationship definition having a means attribute is configured with the highest translation priority in the translation sequence as compared to the other interrelationship definitions or is configured with a translation priority higher to any other interrelationship definitions but only lower than the interrelationship definition having a subordination attribute in the translation sequence.

2. The device of claim 1, wherein the automatic computer translating module combines a subordinating element noun with the interrelationship definition having a subordination attribute to perform translation, and the subordinating element noun is corresponding to the interrelationship definition having the subordination attribute.

3. The device of claim 1, wherein the interrelationship definition having a past participle attribute is translated in combination of the front neighbor interrelationship definition.

4. The device of claim 1, wherein the interrelationship definition having a subordination attribute is configured with the highest translation priority in the translation sequence as compared to the other interrelationship definitions.

5. The device of claim 1, wherein the interrelationship definition having a direction-positioning attribute is reorganized to raise in a translation sequence comparing to the interrelationship definition with other interrelationship definition belonging attributes, or is organized to be next only to the interrelationship definition having a subordination attribute and the interrelationship definition having a means attribute in a translation sequence.

6. The device of claim 1, wherein the automatic computer translating module performs the translation by combining the interrelationship definition having an action attribute with the front neighbor interrelationship definition and/or front located interrelationship definition having a present-participle-without-preposition-following attribute.

7. The device of claim 1, wherein the interrelationship definitions having different interrelationship definition belonging attributes are translated with different translation sequences.

8. The device of claim 1, wherein the translation result is obtained by displaying by an organized structure formed by the element nouns, the interrelationship definitions and the objective elements.

9. The device of claim 1, wherein the interrelationship definition belonging attribute is one selected from a group comprising a direction-positioning attribute, a present-participle-with-preposition-following attribute, a present-participle-without-preposition-following attribute, a past participle attribute, an action attribute, a subordination attribute and a means attribute.

10. The device of claim 9, wherein the automatic computer translating module combines a subordinating element noun with the interrelationship definition having the subordination attribute to perform translation, and the subordinating element noun is corresponding to the interrelationship definition having the subordination attribute.

11. The device of claim 9, wherein the interrelationship definition having the past participle attribute is translated in combination of the front neighbor interrelationship definition.

12. The device of claim 9, wherein the interrelationship definition having the subordination attribute is configured with the highest translation priority in the translation sequence as compared to the other interrelationship definitions.

13. The device of claim 9, wherein the interrelationship definition having the direction-positioning attribute is reorganized to raise in a translation sequence comparing to the interrelationship definition with other interrelationship definition belonging attributes, or is organized to be next only to the interrelationship definition having the subordination attribute and the means attribute in a translation sequence.

14. The device of claim 9, wherein the automatic computer translating module performs the translation by combining the interrelationship definition having the action attribute with the front neighbor interrelationship definition and/or front located interrelationship definition having the present-participle-without-preposition-following attribute.

15. The device of claim 9, wherein the interrelationship definitions having different interrelationship definition belonging attributes are translated with different translation sequences.

* * * * *